US010176028B2

(12) United States Patent
Chen et al.

(10) Patent No.: US 10,176,028 B2
(45) Date of Patent: Jan. 8, 2019

(54) UPGRADING A KERNEL OR KERNEL MODULE WITH A CONFIGURED PERSISTENT MEMORY UNUSED BY THE KERNEL

(71) Applicant: International Business Machines Corporation, Armonk, NY (US)

(72) Inventors: Lior Chen, Jerusalem (IL); Alex Friedman, Herzliya (IL); Constantine Gavrilov, Rishon-Le-Zion (IL); Aharon Novogrodski, Jerusalem (IL); Alex Snast, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 14/866,747

(22) Filed: Sep. 25, 2015

(65) Prior Publication Data
US 2017/0091002 A1    Mar. 30, 2017

(51) Int. Cl.
*G06F 9/54*  (2006.01)
*G06F 12/02*  (2006.01)
(Continued)

(52) U.S. Cl.
CPC ........... *G06F 9/545* (2013.01); *G06F 8/65* (2013.01); *G06F 9/4406* (2013.01);
(Continued)

(58) Field of Classification Search
CPC .... G06F 8/65; G06F 12/1441; G06F 12/1491; G06F 9/545; G06F 9/4406; G06F 12/023;
(Continued)

(56) References Cited

U.S. PATENT DOCUMENTS 5,802,605 A * 9/1998 Alpert ................. G06F 12/1009
                                                        711/208
6,854,070 B2    2/2005 Johnson et al.
(Continued)

OTHER PUBLICATIONS

"Chapter 15 Memory Mapping and DMA", ch15, 13676, 52 , Linux Device Drivers, 3rd Edition, copyright 2005, pp. 412-463.
(Continued)

*Primary Examiner* — Glenn Gossage
(74) *Attorney, Agent, or Firm* — David W. Victor; Konrad, Raynes, Davda and Victor LLP (57) ABSTRACT

A computer program product, system, and method are provided for upgrading a kernel or kernel module with a configured persistent. A persistent memory memory space is configured in the memory to store application data from applications in user mode. A kernel executing in the memory is prevented from accessing the persistent memory space. A service is called to load an updated kernel in the memory to replace the kernel, wherein the applications have access to the persistent memory space after the updated kernel is loaded. The service may comprise a kernel execution mechanism that directly loads the updated kernel into the memory without a full reboot of the computer system. An extended memory kernel service may be loaded during a boot operation to reserve the persistent memory space as an extended memory space for use by the applications and prevent the kernel from accessing the persistent memory space.

20 Claims, 5 Drawing Sheets

(51) Int. Cl.
*G06F 9/44* (2018.01)
*G06F 12/14* (2006.01)
*G06F 9/4401* (2018.01)
*G06F 8/65* (2018.01)

(52) U.S. Cl.
CPC .......... *G06F 12/023* (2013.01); *G06F 12/145* (2013.01); *G06F 2212/1044* (2013.01); *G06F 2212/1052* (2013.01)

(58) Field of Classification Search
CPC ........... G06F 12/145; G06F 2212/1044; G06F 2212/1052
See application file for complete search history.

(56) References Cited

U.S. PATENT DOCUMENTS

| | | | |
|---|---|---|---|
| 6,996,648 B2 | 2/2006 | Vu | |
| 7,472,249 B2 | 12/2008 | Cholleti et al. | |
| 8,495,351 B2 | 7/2013 | Arditti et al. | |
| 8,751,785 B2 | 6/2014 | Aloni et al. | |
| 8,789,034 B1* | 7/2014 | Emelyanov | G06F 9/45558 717/169 |
| 9,128,625 B1 | 9/2015 | Ananthabhotla | |
| 2002/0116590 A1* | 8/2002 | Franaszek | G06F 12/023 711/170 |
| 2010/0250908 A1* | 9/2010 | Amann | G06F 8/67 713/1 |
| 2012/0110236 A1* | 5/2012 | Ali | G06F 12/1009 711/6 |
| 2013/0132695 A1* | 5/2013 | Heo | G06F 12/1491 711/163 |
| 2014/0068240 A1 | 3/2014 | Nightingale et al. | |
| 2014/0201728 A1* | 7/2014 | Du Toit | G06F 8/65 717/171 |
| 2014/0281454 A1* | 9/2014 | Even | G06F 9/4406 713/2 |
| 2014/0281459 A1 | 9/2014 | Friedman et al. | |
| 2014/0281463 A1 | 9/2014 | Even et al. | |
| 2014/0298000 A1* | 10/2014 | Gillespie | G06F 9/4418 713/2 |
| 2014/0372746 A1 | 12/2014 | Aloni et al. | |
| 2015/0052287 A1 | 2/2015 | Venkatasubramanian et al. | |
| 2015/0121055 A1 | 4/2015 | Zimmer et al. | |
| 2015/0178097 A1* | 6/2015 | Russinovich | G06F 9/4418 713/2 |

OTHER PUBLICATIONS

V. Goyal, et al., "Kdump, A Kexec-based Kernel Crash Dumping Mechanism", Proceedings of the Linux Symposium, vol. One, Jul. 2005, Ottawa, Ontario Canada, pp. 169-180.
W. Almesberger, "kboot—A Boot Loader Based on Kexec", 14, Proceedings of the Linux Symposium, vol. 1, Jul. 19-22, 2006, pp. 27-38.
N. Savarimuthu, et al., "KuRB: Kernal Microreboot Mechanism", Department of Computer Applications, National Institute of Technology Tiruchirappalli, Tamilnadu, India, Oct. 2012, 3 pages.
D. Hepkin, "Overview of AIX Page Replacement", IBM Corporation, developerWorks, Jan. 8, 2008, pp. 1-13.
M. Wegiel, et al., "XMem: Type-Safe, Transparent, Shared Memory for Cross-Runtime Communication and Coordination", ACM, 2008, PLDI '08, Jun. 2008, Tucson, Ariz., 12 pages.
"Kernel Extensions and Device Support Programming Concepts", AIX 5L Version 5.3, IBM Corporation, Seventh Edition Oct. 2009, (Publication No. SC23-4900-06), pp. i-386.
K. Milberg, "Optimizing AIX 7 Memory Performance: Part 1, Memory Overview and Tuning Memory Parameters", IBM Corporation, developerWorks, Nov. 2, 2010, pp. 1-11.
C. Lameter, Ph.D., "NUMA (Non-Uniform Memory Access): an Overview", ACM Queue, [online] [retrieved Sep. 2, 2015] https://queue.acm.org/detail.cfm?id=2513149, Aug. 2013, vol. 11, Issue 7, pp. 412-463.
"Xmemout Kernel Service", Technical Reference: Kernel and Subsystems, vol. 1, [online] [retrieved Sep. 2, 2015] http://www-01.ibm.com/support/knowledgecenter/api/content/nl/en-us/s . . . , (partial URL only), 2 pages.
"Kexec", Wikipedia, [online] [retrieved Sep. 3, 2015], https://en.wikipedia.org/w/index.php?title=Kexec&printable=yes, 2 pages.

* cited by examiner

UPGRADING A KERNEL OR KERNEL MODULE WITH A CONFIGURED PERSISTENT MEMORY UNUSED BY THE KERNEL

BACKGROUND OF THE INVENTION

1. Field of the Invention

The present invention relates to a computer program product, system, and method for upgrading a kernel or kernel module with a configured persistent memory unused by the kernel.

2. Description of the Related Art

One issue with current computer systems, especially enterprise systems, is how to perform a hot upgrade of components with minimal disruption to application operations, such as a user space application, kernel modules, and the kernel. Upgrading certain components, such as the kernel, requires a system boot, which may result in loss of application data in shared memory segments and driver memory pools and otherwise disrupt application operations. A hot upgrade of the kernel also needs to be performed quickly to minimize the impact on application programs.

There is a need in the art for improved techniques for managing updating a kernel in memory.

SUMMARY

Provided are a computer program product, system, and method for upgrading a kernel or kernel module with a configured persistent memory unused by the kernel. A persistent memory space is configured in the memory to store application data from applications in user mode. A kernel executing in the memory is prevented from accessing the persistent memory space. A service is called to load an updated kernel in the memory to replace the kernel, wherein the applications have access to the persistent memory space after the updated kernel is loaded.

DETAILED DESCRIPTION

Described embodiments provide techniques for upgrading any component that requires a boot, including kernel and kernel modules, without affecting data of the component in a persistent memory space. A kernel service is used to handle the mapping and unmapping of memory for the persistent memory space in order to store data for user applications. The persistent memory space is used by applications, including user space applications, and may be configured by a kernel module. During a hot upgrade, system reboot or other boot operation, a service is called to load an updated version of an application, such as the kernel, to replace the current version of the application. User applications have access to the persistent memory space after the updated kernel is loaded because the application data in the persistent memory space will not have been disturbed by the uploading of a new updated application or kernel. The kernel is not provided a memory allocation to the persistent memory to be able to access the persistent memory to alter application data stored in the persistent memory during the upgrade.

Figure 1:
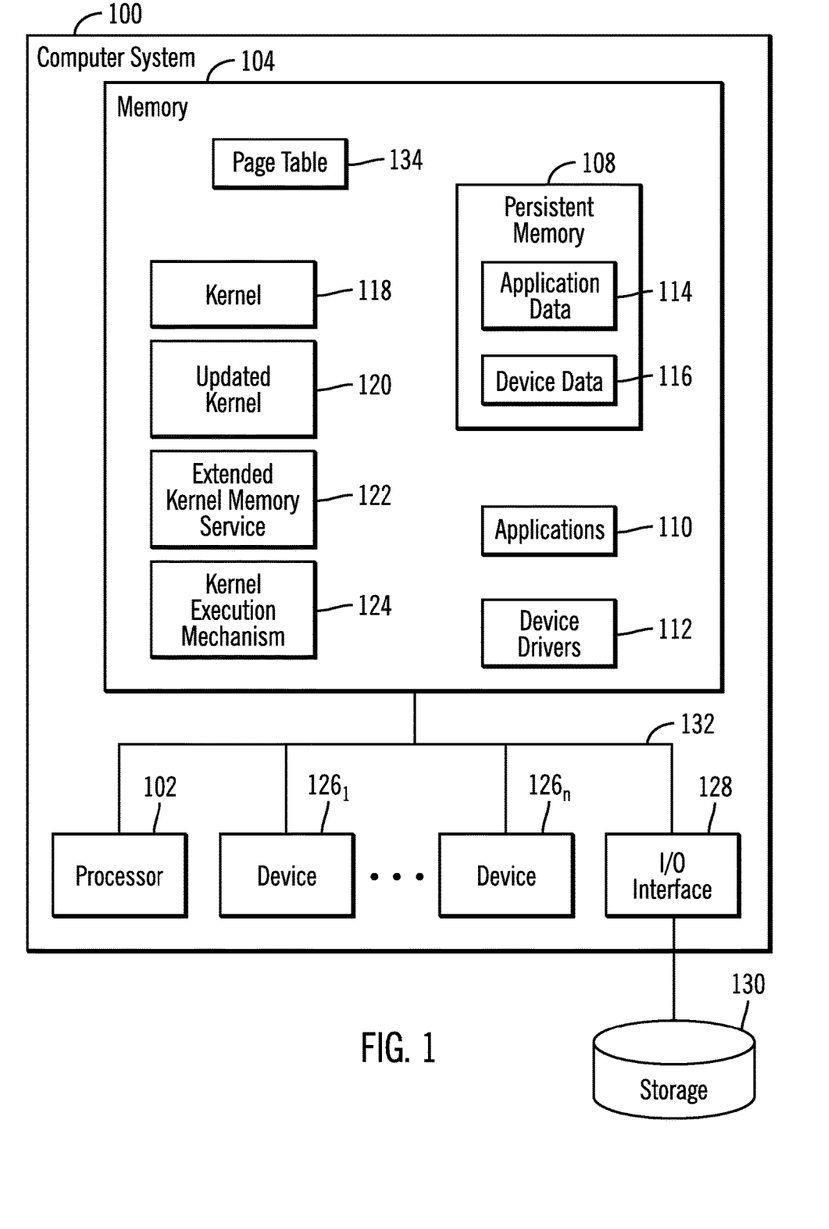
FIG. 1 illustrates an embodiment of a computing system.

FIG. 1 illustrates an embodiment of a computing environment comprising a computer system 100 having a processor 102, a main memory 104, such as a main system memory, including kernel components executed by the processor 102, user applications 110, device drivers 112, and a persistent memory 108 used by the applications 110 and device drivers 112 to store application data 114 and device data 116. The persistent memory 108 is capable of retaining data through a boot operation. The memory 104 includes a kernel 118 to perform operating system and other kernel related operations; an updated kernel 120 loaded into the memory 104 in the manner described below to update and overwrite the kernel 118; an extended kernel memory service 122 to create and manage memory services; and a kernel execution mechanism 124, such as kexec, to live boot or load the updated kernel 120 into the memory 104 without requiring a reboot of the computer system 100.

The processor 102 and memory 104 may further be coupled to a bus 132 that connects to a plurality of devices $126_1 \ldots 126_n$, such as the devices for which the device drivers 112 are provided. The computer system 100 may further include an Input/Output interface 128 to communicate with one or more storage devices 130. The processor 102 may execute the different modules and components 118, 120, 122, 124 110, 112 loaded in the memory 104.

The memory device 104 may comprise suitable devices known in the art for functioning as a main memory of a computer system, such as a Random Access Memory (RAM), Dynamic RAM (DRAM), storage-class memory (SCM), Phase Change Memory (PCM), resistive random access memory (RRAIVI), spin transfer torque random access memory (STT-RAM), conductive bridging RAM (CBRAM), etc.

The storage 130 may comprise a suitable storage device known in the art providing non-volatile storage, such as a magnetic hard disk, solid state drive (SSD), and other storage devices known in the art.

Figure 2:
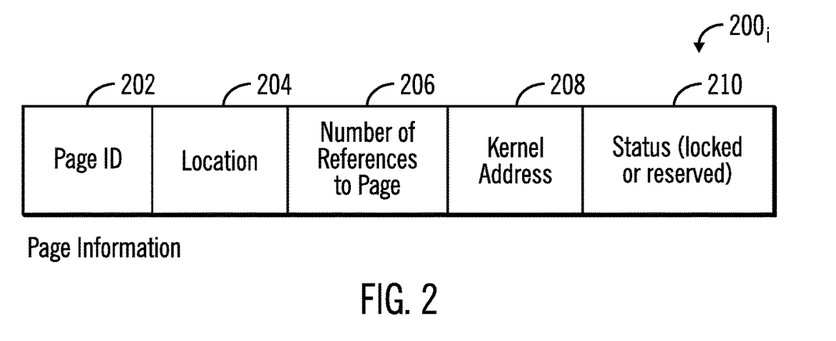
FIG. 2 illustrates an embodiment of page information for a memory page.

A page table 134 provides information on pages configured in the memory 104 providing a mapping of logical to physical addresses. FIG. 2 illustrates an embodiment of page information $200_i$ maintained for each page configured in the memory spaces 104, 108 (FIG. 1). The page information $200_i$ for page i, includes a page identifier (ID) 202; a location 204 in the memory 104 of the page; a number of references to the page 206; a kernel address 208 of the page, which may have a kernel address for use in the kernel address space 106 or a value of void if there is no kernel address, i.e., the page is in the persistent memory 108 and not used by the kernel 118; and a status field 210 indicating whether the page i is locked or reserved and not accessible to the kernel 118.

The persistent memory 108 is comprised of pages i configured to have a void kernel address 208 and a status 210 of reserved which prevents the kernel 118 from accessing that page. The pages in the persistent memory 108 are accessible in user mode, such as to the applications 110 and device drivers 112. Although the kernel 118 is prevented from accessing pages in the persistent memory 118 by not having been allocated memory, kernel services, such as the extended kernel memory service 122, e.g., XMEM, can map and unmap pages to the persistent memory 108 as part of memory management operations. XMEM provides an implementation of the persistent memory 108 comprising a persistent shared memory that retains data through a boot operation. The persistent memory 108 allows a "hot upgrade" of the kernel 118 without loss of data in the persistent memory 108 used by applications 110 and device drivers 110.

Figure 3:
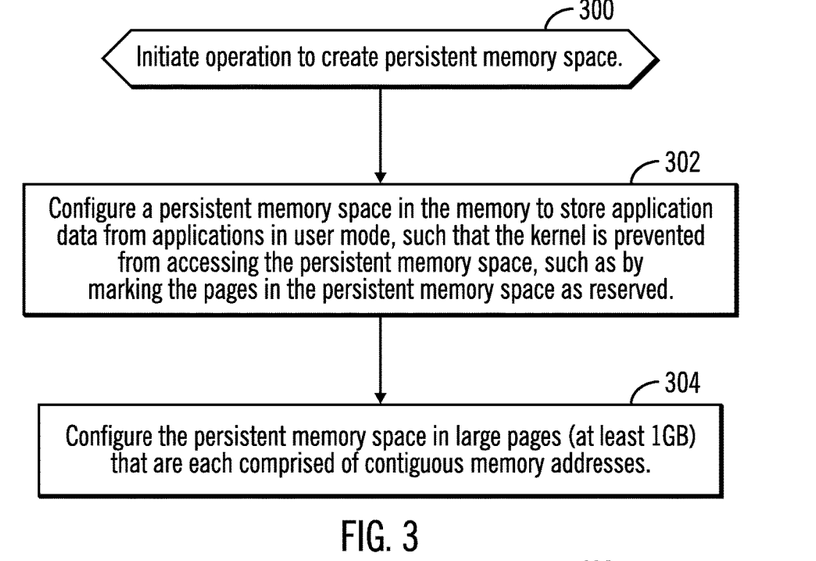
FIG. 3 illustrates an embodiment of operations to create a persistent memory space.

FIG. 3 illustrates an embodiment of operations performed to configure the persistent memory space 108. In one embodiment, the operations may be performed by the extended kernel memory service 122, such as an XMEM routine. The operations may be initiated during a boot operation or in response to an Application Program Interface (API) call from an application 110 or other component. In response to being initiated (at block 300), the extended kernel memory service 122, or other component, configures (at block 302) the persistent memory space 108 in the memory 104 to store application data 114 from applications 110 in user mode. The kernel 118 is prevented from accessing the persistent memory space 108 by configuring the pages in the persistent memory space 108 so as not to provide the kernel 118 a regular memory allocation to access the persistent memory space 108. In one embodiment, the kernel 118 is prevented from accessing the persistent memory 108 by providing a null value for the virtual address 208 for the kernel 118 and by setting the status 210 to reserved. In this way, the kernel 118 is not provided a memory allocation of the persistent memory space 108 to use.

The reservation of the persistent memory 108 can be performed by the kernel 118 during startup or by a Basic Input Output System (BIOS) firmware, a hypervisor or virtual machine manager or any other program that runs before the kernel during a boot or initialization procedure.

The extended kernel memory service 122 may configure (at block 304) the persistent memory 108 to include extra-large pages, such as at least one gigabyte of contiguous memory addresses in the memory 104. Configuring large pages of contiguous memory improves speed and performance by decreasing the memory mapping times on the order from a few seconds to 30 microseconds.

The extended kernel memory service 122 may comprise the XMEM service, and may handle the mapping and unmapping of the persistent memory 108 regions, and free unused pages, i.e., pages $200_i$ having a zero reference count 206. Configuring extra-large memory pages results in substantial decreases in the mapping times. Further by configuring contiguous memory space to the pages in the persistent memory 108, contiguous memory regions may be passed to devices $126_1 \ldots 126_n$, such as hardware cards, that operate more optimally with contiguous memory spaces. Thus, configuring large pages of contiguous space in the memory 104 improves page mapping and swapping operations and improves the performance of applications and devices that operate more optimally with contiguous memory addresses, such as by performing sequential access operations.

By configuring the persistent memory space 108 to prevent use by the kernel 118 through a regular kernel memory allocation, the updating of the kernel 118 will not disturb application data 114 and device data 116 used by applications 110 and device drivers 112 because the kernel 118 is prevented from accessing the persistent memory space 108. Further, the persistent memory space 108 is configured to survive a "hot update" of the kernel 118 or rebooting of the system 100. For instance, after the kernel 118 is updated with the updated kernel 120, the applications 110 and device drivers 112 can continue operations without disruption in the state they were operating before the update operation.

Figure 4:
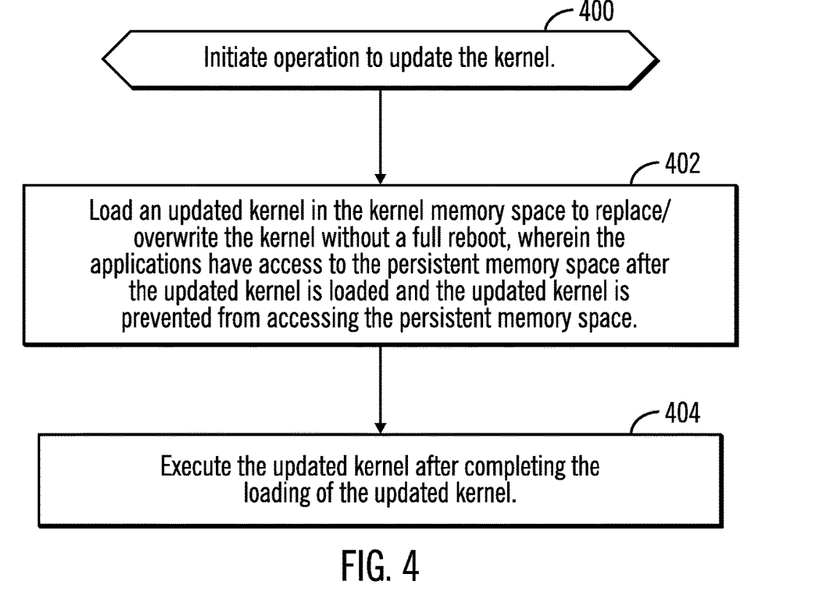
FIG. 4 illustrates an embodiment of operations to update a kernel.

FIG. 4 illustrates an embodiment of operations performed to update the kernel 118 (FIG. 1) with the updated kernel 120. In one embodiment, the operations to update the kernel 118 may be performed by the kernel execution mechanism 124. Upon initiating the operations (FIG. 4, at block 400), the kernel execution mechanism 124 loads (at block 402) the updated kernel 120 into the memory 104 to overwrite the kernel 118 without a full reboot. During the kernel execution mechanism 124 update process, the memory 104 regions other than the persistent memory space 108 may be overwritten, so that the persistent memory space 108 is not affected by the kernel update process. Further, the applications 110 and device drivers 112 have access to the persistent memory space 108 after the updated kernel 120 is loaded. Further, the update of the kernel 118 may be performed without rebooting the system 100. After the loading, the updated kernel 120 can start executing (at block 404) immediately and the older kernel 118 is overwritten. Further, after the update, the applications 110 and drivers 112 may continue to access the application data 114 and device data 116 in the persistent memory 108 in the same manner as they were before the update.

Described embodiments provide techniques for updating a kernel in a manner that minimizes disruptions to application programs by maintaining a persistent memory space accessible to the user space, such as applications and device drivers, that is not accessible to the kernel through a kernel memory allocation. In this way, the updating of the kernel does not affect the application data in the persistent memory.

Figure 5:
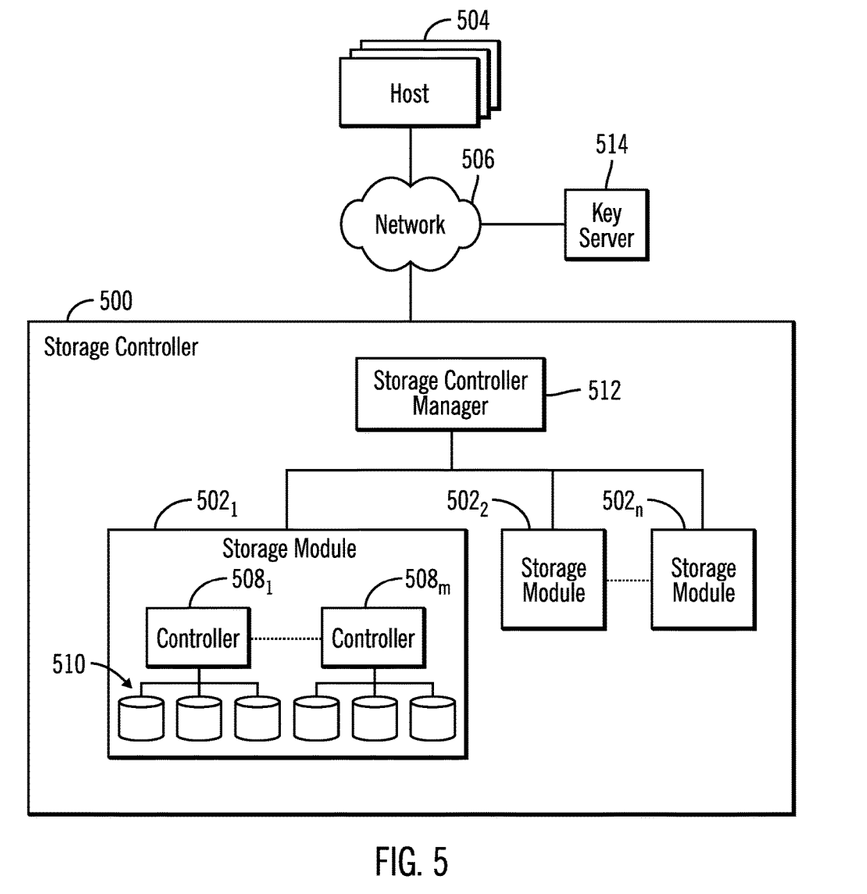
FIG. 5 illustrates an embodiment of a clustered storage controller.

FIG. 5 illustrates a storage controller implementation 500 utilizing the computer system 100 embodiment of FIG. 1. The storage controller 500 may comprise a clustered storage controller having a plurality of independent storage modules $502_1, 502_2 \ldots 502_n$ each capable of receiving read and write requests from host systems 504 over a network 506 that are directed to storage devices within the storage modules $502_1, 502_2 \ldots 502_n$. The storage modules $502_1, 502_2 \ldots 502_n$ may each include components as shown in storage module $502_1$, including one or more controllers $508_1 \ldots 508_m$, where each controller manages access to connected storage devices 510. The controllers $508_1 \ldots 508_m$ may comprise a controller type comprising Redundant Array of Independent Disk (RAID), Just a Bunch of Disk (JBOD), Serial Attached SCSI (SAS), Serial Advanced Technology Attachment (SATA), etc. In certain embodiments, each of the storage modules $502_1, 502_2 \ldots 502_n$ may implement the computer system 100 of FIG. 1 and perform the above described operations of FIGS. 3 and 4 to update a kernel component of the storage module $502_1, 502_2 \ldots 502_n$ operating system. A storage controller manager 512 manages the different storage modules $502_1, 502_2 \ldots 502_n$ as a clustered group.

The network 506 over which devices communicate may comprise a network such as a local area network (LAN), storage area network (SAN), wide area network (WAN), cloud computing model, etc. In further embodiments, some or all of the devices in FIGS. 1 and 5 may be connected by a direct cable connection or may comprise components on a single computer system platform, and may communicate over a bus or via memory.

The storage devices 510 in FIG. 5 may comprise storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque random access memory (STT-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk™, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

Figure 6:
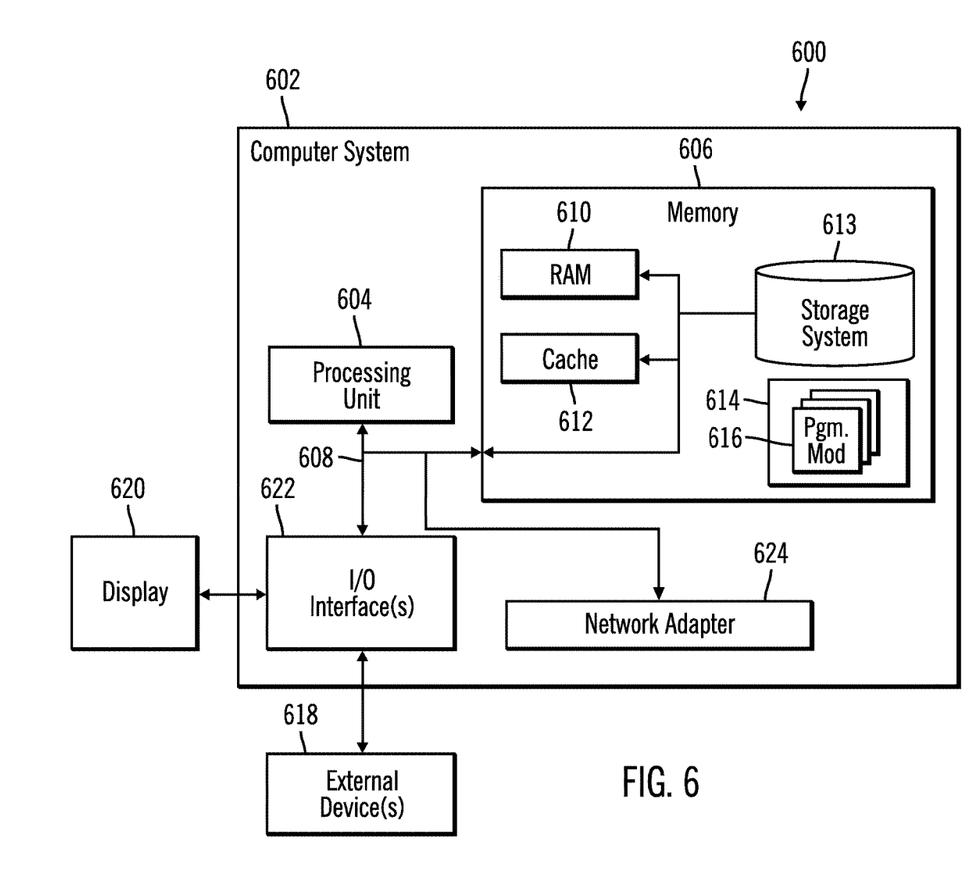
FIG. 6 illustrates a computing environment in which the components of FIGS. 1 and 5 may be implemented.

The computer system 100 and computational components of FIG. 1 and FIG. 5 may be implemented in one or more computer systems, such as a computer system 602 shown in a computing environment 600 in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interface(s) 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components may be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a memory in a computer system, the computer program product comprising a computer readable storage medium storing computer readable program code, which when executed by a processor, causes the processor to perform operations, the operations comprising:
configuring a persistent memory space in the memory to store application data from applications in user mode by indicating in page information for each of a plurality of pages of the persistent memory space that there is no kernel address for the page and that the page is reserved and not accessible by a kernel executing in the memory, wherein the kernel is prevented from accessing the persistent memory space;
calling a service to perform a kernel update process to load an updated kernel comprising an updated version of the kernel in the memory without loss of data in the persistent memory space;
during the loading of the updated kernel, overwriting memory regions other than the persistent memory space, wherein the pages of the persistent memory space are not affected by the kernel update process; and
accessing, by the applications, the pages of the persistent memory space after the updated kernel is loaded to continue operations without disruption in a state in which the applications were operating before the kernel update process.

2. The computer program product of claim 1, wherein the persistent memory space comprises contiguous memory addresses.

3. The computer program product of claim 2, wherein the persistent memory space is configured with large pages comprising at least one gigabyte of space.

4. The computer program product of claim 1, wherein the service called to load the updated kernel comprises a kernel execution mechanism that directly loads the updated kernel into the memory without a full reboot of the computer system, wherein the updated kernel executes immediately after being loaded into the memory and overwrites a current version of the kernel subject to the update.

5. The computer program product of claim 1, wherein the configuring the persistent memory space comprises:
loading an extended kernel memory service during a boot operation to perform the indicating in the page information to reserve the persistent memory space as an extended memory space for use by the applications, wherein the reservation of the persistent memory space prevents the kernel and the updated kernel from accessing the persistent memory space.

6. The computer program product of claim 5, wherein the operations further comprise:
unmapping, by the extended kernel memory service, unused regions of the persistent memory space to be accessible to the kernel.

7. The computer program product of claim 1, wherein the updated kernel is loaded in the memory to replace the kernel without a reboot.

8. A system, comprising:
a processor;
a memory;
a computer readable storage medium storing program code, which when executed by the processor, causes the processor to perform operations, the operations comprising:
configuring a persistent memory space in the memory to store application data from applications in user mode by indicating in page information for each of a plurality of pages of the persistent memory space that there is no kernel address for the page and that the page is reserved and not accessible by a kernel executing in the memory, wherein the kernel is prevented from accessing the persistent memory space;
calling a service to perform a kernel update process to load an updated kernel comprising an updated version of the kernel in the memory without loss of data in the persistent memory space;
during the loading of the updated kernel, overwriting memory regions other than the persistent memory space, wherein the pages of the persistent memory space are not affected by the kernel update process; and
accessing, by the applications, the pages of the persistent memory space after the updated kernel is loaded to continue operations without disruption in a state in which the applications were operating before the kernel update process.

9. The system of claim 8, wherein the persistent memory space comprises contiguous memory addresses.

10. The system of claim 9, wherein the persistent memory space is configured with large pages comprising at least one gigabyte of space.

11. The system of claim 8, wherein the service called to load the updated kernel comprises a kernel execution mechanism that directly loads the updated kernel into the memory without a full reboot of the system, wherein the updated kernel executes immediately after being loaded into the memory and overwrites a current version of the kernel subject to the update.

12. The system of claim 8, wherein the configuring the persistent memory space comprises:
loading an extended kernel memory service during a boot operation to perform the indicating in the page information to reserve the persistent memory space as an extended memory space for use by the applications, wherein the reservation of the persistent memory space prevents the kernel and the updated kernel from accessing the persistent memory space.

13. The system of claim 12, wherein the operations further comprise:
unmapping, by the extended kernel memory service, unused regions of the persistent memory space to be accessible to the kernel.

14. The system of claim 8, wherein the updated kernel is loaded in the memory to replace the kernel without a reboot.

15. A method, comprising:
   configuring a persistent memory space in a computer memory to store application data from applications in user mode by indicating in page information for each of a plurality of pages of the persistent memory space that there is no kernel address for the page and that the page is reserved and not accessible by a kernel executing in the computer memory, wherein the kernel is prevented from accessing the persistent memory space;
   calling a service to perform a kernel update process to load an updated kernel comprising an updated version of the kernel in the computer memory without loss of data in the persistent memory space;
   during the loading of the updated kernel, overwriting memory regions other than the persistent memory space, wherein the pages of the persistent memory space are not affected by the kernel update process; and
   accessing, by the applications, the pages of the persistent memory space after the updated kernel is loaded to continue operations without disruption in a state in which the applications were operating before the kernel update process.

16. The method of claim 15, wherein the persistent memory space comprises contiguous memory addresses.

17. The method of claim 16, wherein the persistent memory space is configured with large pages comprising at least one gigabyte of space.

18. The method of claim 15, wherein the service called to load the updated kernel comprises a kernel execution mechanism that directly loads the updated kernel into the computer memory without a full reboot of a computer system, wherein the updated kernel executes immediately after being loaded into the computer memory and overwrites a current version of the kernel subject to the update.

19. The method of claim 15, wherein the configuring the persistent memory space comprises:
   loading an extended memory kernel service during a boot operation to perform the indicating in the page information to reserve the persistent memory space as an extended memory space for use by the applications, wherein the reservation of the persistent memory space prevents the kernel and the updated kernel from accessing the persistent memory space.

20. The method of claim 15, wherein the updated kernel is loaded in the computer memory to replace the kernel without a reboot.

* * * * *